United States Patent
Jackson et al.

(10) Patent No.: US 8,594,587 B2
(45) Date of Patent: Nov. 26, 2013

(54) METHOD AND APPARATUS FOR INTEGRATED WAVEGUIDE TRANSMIT-RECEIVE ISOLATION, FILTERING, AND CIRCULAR POLARIZATION

(75) Inventors: Thomas Jackson, Monrovia, MD (US); Guo Chen, Vienna, VA (US); Larry Cronise, Spencerville, MD (US); Peter Hou, Germantown, MD (US); Barre Lankford, Sykesville, MD (US); Edmund Lott, Mount Airy, MD (US); Prakash Hari, Germantown, MD (US); Arul Thangavelu, Boyds, MD (US); Rajesh Joshi, Germantown, MD (US); Keith Russell, Cambridge, MA (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 13/078,612

(22) Filed: Apr. 1, 2011

(65) Prior Publication Data

US 2011/0243562 A1    Oct. 6, 2011

Related U.S. Application Data

(60) Provisional application No. 61/321,055, filed on Apr. 5, 2010.

(51) Int. Cl.
*H04B 1/38* (2006.01)
*H04M 1/00* (2006.01)

(52) U.S. Cl.
USPC ............ 455/90.3; 455/550.1; 455/575.1

(58) Field of Classification Search
USPC ............ 455/78, 83, 550.1, 570, 575.1, 575.8, 455/90.3, 128, 347
See application file for complete search history.

(56) References Cited

U.S. PATENT DOCUMENTS

| | | | | |
|---|---|---|---|---|
| 5,801,590 | A * | 9/1998 | Kashima et al. | 331/68 |
| 5,959,592 | A * | 9/1999 | Petruzzelli | 725/68 |
| 2002/0167449 | A1 | 11/2002 | Frazita et al. | |
| 2003/0035386 | A1 * | 2/2003 | Sullivan | 370/316 |
| 2006/0049977 | A1 * | 3/2006 | Vacanti | 342/121 |
| 2007/0296518 | A1 | 12/2007 | Avramis et al. | |
| 2009/0231186 | A1 * | 9/2009 | Barak et al. | 342/352 |
| 2009/0309801 | A1 * | 12/2009 | Rao et al. | 343/779 |
| 2010/0029199 | A1 | 2/2010 | Chen et al. | |
| 2011/0243043 | A1 * | 10/2011 | Jackson et al. | 370/297 |

FOREIGN PATENT DOCUMENTS

WO    WO 2010/056609 A2    5/2010

OTHER PUBLICATIONS

European Search Report for EP 11 17 8057 dated Jul. 6, 2012, pp. 1-7.
European App. No. 11178059.9, "Extended European Search Report," Jul. 12, 2012.

* cited by examiner

*Primary Examiner* — Andrew Wendell
(74) *Attorney, Agent, or Firm* — Potomac Technology Law, LLC

(57) ABSTRACT

An radio is provided for transmit-receive isolation filtering and circular polarization (INTRIFPWA) that are sealed within a metal housing of a transmitter, which can be used in microwave communication systems, including satellite based communications systems and terrestrial based microwave communication systems.

20 Claims, 10 Drawing Sheets

400

500

700

US 8,594,587 B2

METHOD AND APPARATUS FOR INTEGRATED WAVEGUIDE TRANSMIT-RECEIVE ISOLATION, FILTERING, AND CIRCULAR POLARIZATION

RELATED APPLICATIONS

This application claims the benefit of the earlier filing date under 35 U.S.C. §119(e) of U.S. Provisional Application Ser. No. 61/321,055 filed Apr. 5, 2010, entitled "Method And Apparatus For Integrating Waveguide Transmit-Receive Isolation, Filtering, And Polarizer", the entirety of which is incorporated herein by reference.

BACKGROUND OF THE INVENTION

Microwave communication systems (e.g., Satellite based communications, etc.) become popular, especially where asymmetrical digital subscriber lines (ADSL) and cables are not available. By way of example, fixed service satellite (FSS) systems have huge capacities with a relatively economical price structures, and the FSS systems provide various applications for subscribers, such as telephony, fax, television, high speed data communication services, Internet access, satellite news gathering (SNG), digital audio broadcasting (DAB), etc.

Existing radios of microwave communication systems employ either discrete waveguide devices, such as an orthomode transducer, a diplexer, and a polarizer or an assembly of the same each as stand-alone or a separate external module, both are exposed to the elements. There are many inherent disadvantages with this approach, including, e.g., susceptibility to water leakage, higher manufacturing costs, and relatively large volume and mass.

SOME EXAMPLE EMBODIMENTS

Therefore, there is a need for an approach a radio design that can overcome these disadvantages.

According to one embodiment, an apparatus comprises a transmitter configured to operate over a microwave link, a low noise block converter, and a transmit-receive isolation assembly including a polarizer that converts linearly polarized signals into circularly polarized signals or vice versa. The apparatus also comprises a transmitter housing sealed therein at least a part of the low noise block converter, at least a part of the transmit-receive isolation assembly, or a combination thereof.

According to another embodiment, a method comprises providing an apparatus comprising a transmitter configured to operate over a microwave link, a low noise block converter, a transmit-receive isolation assembly including a polarizer that converts linearly polarized signals into circularly polarized signals or vice versa, and a transmitter housing sealed therein sealed therein at least a part of the low noise block converter, at least a part of the transmit-receive isolation assembly, or a combination thereof. The method also comprises performing transmit-receive isolation filtering and polarization using the apparatus over a microwave link.

According to yet another embodiment, a method comprises metal die-casting a first plate built-in with at least a part of a transmit-receive isolation assembly therein; and metal die-casting a second plate built-in with at least another part of a transmit-receive isolation assembly therein. The method also comprises metal die-casting a transmitter housing of the radio; and sealing in the transmitter housing at least a part of a low noise block converter, at least a part of a transmit-receive isolation assembly, or a combination thereof.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A system, method, and apparatus for an integrated waveguide transmit-receive isolation, filtering, and polarization are described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

There are over three hundred communications satellites in the geostationary orbit. Subscribers can use a fixed pointing very small aperture terminal (VSAT) to communicate with the communications satellites.

Figure 1:
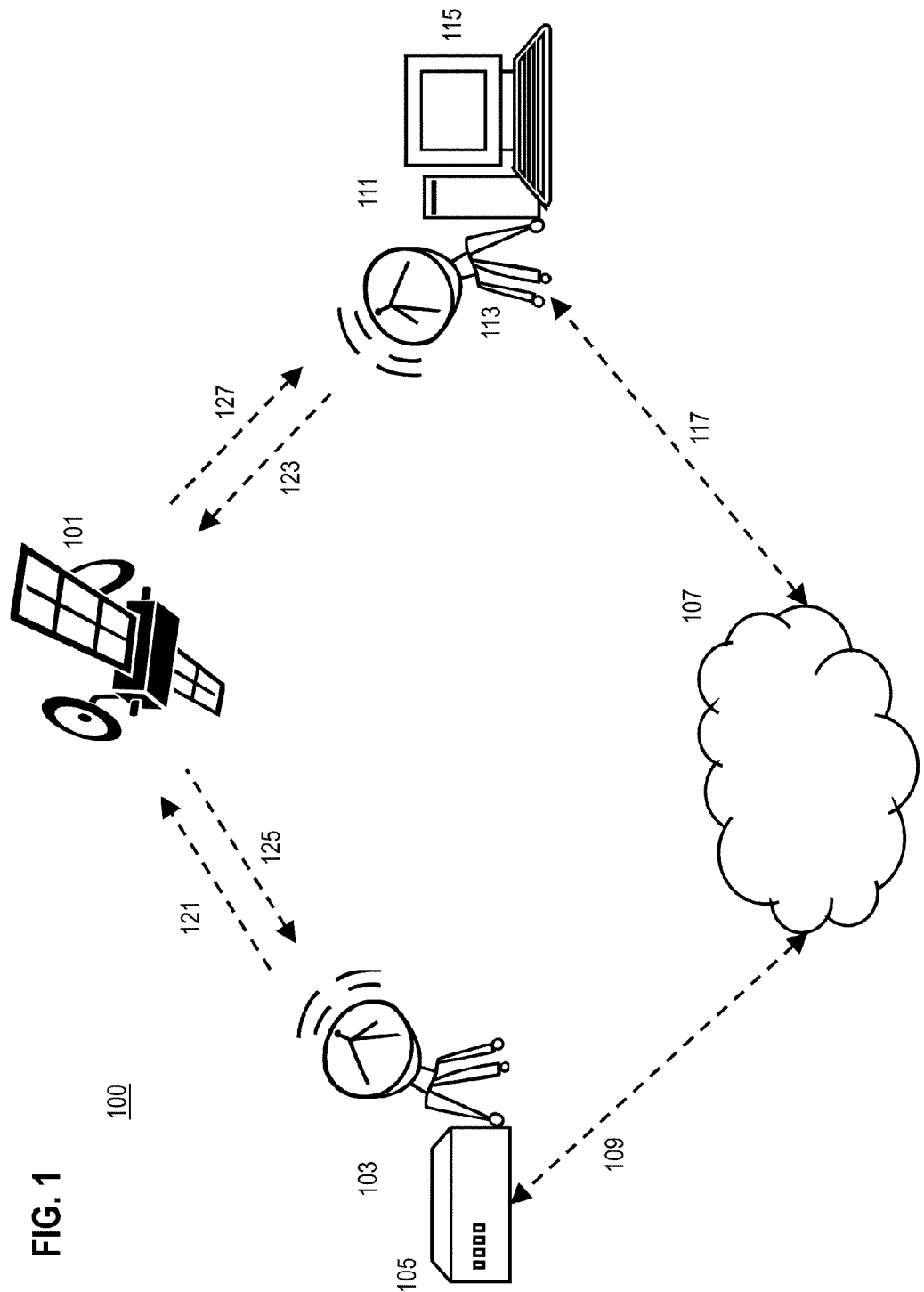
FIG. 1 is a diagram of a microwave communication system.

FIG. 1 is a diagram of a microwave communication system. The system 100 includes at least one satellite 101 and at least one center hub 103 connected via a server or base station 105 to a network 107. The connection 109 between the server or base station 105 to the network 107 can be wired, wireless, or a combination thereof. The network 107 includes one or more wired/data networks (e.g., LAN, MAN, WAN, the internet, etc.) and one or more wireless networks (e.g., TDMA, GSM, CDMA, GPRS, EDGE, MBMS, DVB, CSD, HSCSD, etc.).

The system 100 also includes a subscriber system 111. The subscriber system 111 include at least one remote ground terminal (e.g., VAST) 113 and a subscriber terminal 115. The subscribers may be individuals, business entities, governmental agencies, etc. The subscriber terminal 115 may comprise access points configured to communicate with other subscriber terminals in the network 107 in accordance with techniques such as, for example, radio frequency (RF), Bluetooth (BT), infrared (IrDA) or any of a number of different wireless networking techniques, including WLAN techniques. The connection 117 between the subscriber terminal 115 and the network 107 can be wired, wireless, or a combination thereof.

The remote ground terminal 113 is utilized at a remote location for communicating via the satellite 101 to the central hub 103. The central hub 103 communicates with multiple remote ground terminals, and has a significantly larger antenna, as well as a significantly larger power output capability than any of the remote ground terminals. The communication satellite 101 receives uplink signals 121 from the central hub 103 and uplink signals 123 from the remote ground based terminal 103. The communication satellite 101 transmits downlink signals 125 to the central hub 103 and downlink signals 127 to the ground based terminal 113. The communication satellite 101 preferably receives signals at a first frequency and transmits signals at a second frequency different from the first frequency.

A very small aperture terminal (VSAT) is a two-way satellite ground station or a stabilized maritime VSAT antenna with a dish antenna that is smaller than 3 meters. The parabolic shape of the dish has special reflective properties that enable it to concentrate and focus signals to a single point, i.e., the focal point. The dish receives and transmits signals, after reflecting and concentrating them, from and to satellites.

VSATs are most commonly used to transmit narrowband data (point of sale transactions such as credit card, polling or RFID data; or SCADA), or broadband data (for the provision of Satellite Internet access to remote locations, VoIP or video). VSATs are also used for transportable, on-the-move (utilizing phased array antennas) or mobile maritime communications. Very small aperture terminal (VSAT) remote terminals can be used to communicate data, voice and video, to or from a remote site to the central hub 103. The center hub 103 has a hub terminal equipment that includes an outdoor transceiver and antenna, indoor integrated modem and multiplexing systems, a single-cable intrafacility link, and a variety of network interfaces that can simultaneously deliver traffic to backbone in TDM, ATM, and IP format. Sectors can be provisioned for 1:N (e.g., N=4) active redundancy.

A VSAT may operate in frequency bands such as C band (4-6 GHz), Ku band (11-14 GHz), and Ka band (17-40 GHz). C band is ideal for heavy rain locations. Ku band is the most popular with dish sizes in the range 60 cm-1.8 m diameter. The Ka band satellite broadband services are rapidly expending.

Ku band is primarily used for satellite communications. Ku band satellites are also used for backhauls and particularly for satellite from remote locations back to a television network's studio for editing and broadcasting. The band is split into multiple segments that vary by geographical region by the International Telecommunication Union (ITU). Ku band systems require smaller dishes than C band because of their shorter wavelengths, (higher frequencies), which when combined with higher satellite transponder power translates into smaller, cheaper antennas on the ground and therefore lower start up and transport costs. As the power increases, the dish's size can decrease. The smaller Ku Band dishes can be easily installed on almost any surface—the ground, roofs or bolted to the side of buildings. This is an important consideration for areas with limited space. Compared with C-band, Ku band is not similarly restricted in power to avoid interference with terrestrial microwave systems, and the power of its uplinks and downlinks can be increased. The satellite operator's earth station antenna requires more accurate position control when operating at Ku band than compared to C band.

New VSAT systems use Ka band technology that promises higher bandwidth rates for lower costs. Ka band dishes are much smaller than Ku band dishes because of the even shorter wavelengths (higher Ka band frequencies) and higher satellite power. The higher frequencies of Ka band are significantly more vulnerable to signal quality problems caused by rainfall. Therefore, Ka-band VSATs usually employ techniques and signal power controls to compensate for fading caused by the rainfall.

Typically, a VSAT remote terminal has a small aperture directional antenna for receiving from and transmitting signals to a satellite, and a feed assembly, attached to the dish. This feed assembly is connected via one or two cables referred to as an inter facility link (IFL) to an in door unit (IDU) that processes the information (voice, video or data) received or for transmission, and an outdoor unit (ODU) mounted near the antenna for transmitting a modulated carrier generated by the IDU to the antenna. The feed assembly is placed at the focal point and includes a feed horn, a radio, etc. A feedhorn (or feed horn) is a horn antenna used to convey radio waves between the radio and the dish. The IDU demodulates incoming signals received from the ODU and also operates as an interface between a user's communication equipment and the ODU. Details of VSAT terminals are further provided in U.S. Pat. No. 5,578,972 to Hadden et al., which is incorporated herein by reference in its entirety.

The signals from the satellite, reflected by the dish and converging at the feed horn, are weak and barely detectable after traversing thousands of miles in space. The signals will also have picked up other extraneous signals ("noise"), as they traverse the atmosphere. The feed horn collects the weak reflected signals and passes them on to the radio. The radio amplifies/boosts the weak received signals without amplifying the noise signals and converts the high frequencies of the signals into lower frequencies (i.e., down converting to the IDU). If the high frequencies were conveyed without down conversion, they require the use of wave guides for conveyance.

In a receive mode, the ODU processes Rx signals and outputs useable information, data, video or voice, which can be passed on to the appropriate device connected to the IDU. For example, if the VSAT system is used for internet access, a router, network switch or computer could be connected to the receiver circuit.

In a transmission mode, information is fed into a modulator, which mixes the information with a carrier signal through a process called modulation. The modulator then outputs the modulated signal to the ODU. The ODU amplifies and increases the frequency of the Tx signal and then feeds it to the feed horn. The feed horn then disperses the signal onto the dish, which reflects the Tx signal, in a focused beam towards the satellite.

Other coupling apparatus heretofore utilized contained various combinations of individual components, including multiple filters and transducers, coupled together as required to perform the necessary task of separating the signals to be transmitted from the received signals. The components are used either as individual devices, or as a stand-alone module of assembly of these devices. These individual waveguide devices or assembly module reside outside the transmitter housing. These waveguide devices need to be weather sealed yet they often break leading to water ingress and the eventual failure of the entire radio assembly. This is due to the inherent complex geometry of these devices that typically require split die-casting of the parts, which are then held together using adhesives or other materials to form weather tight bonds. The bonds are the weak spots subject to breakdowns.

Figure 2:
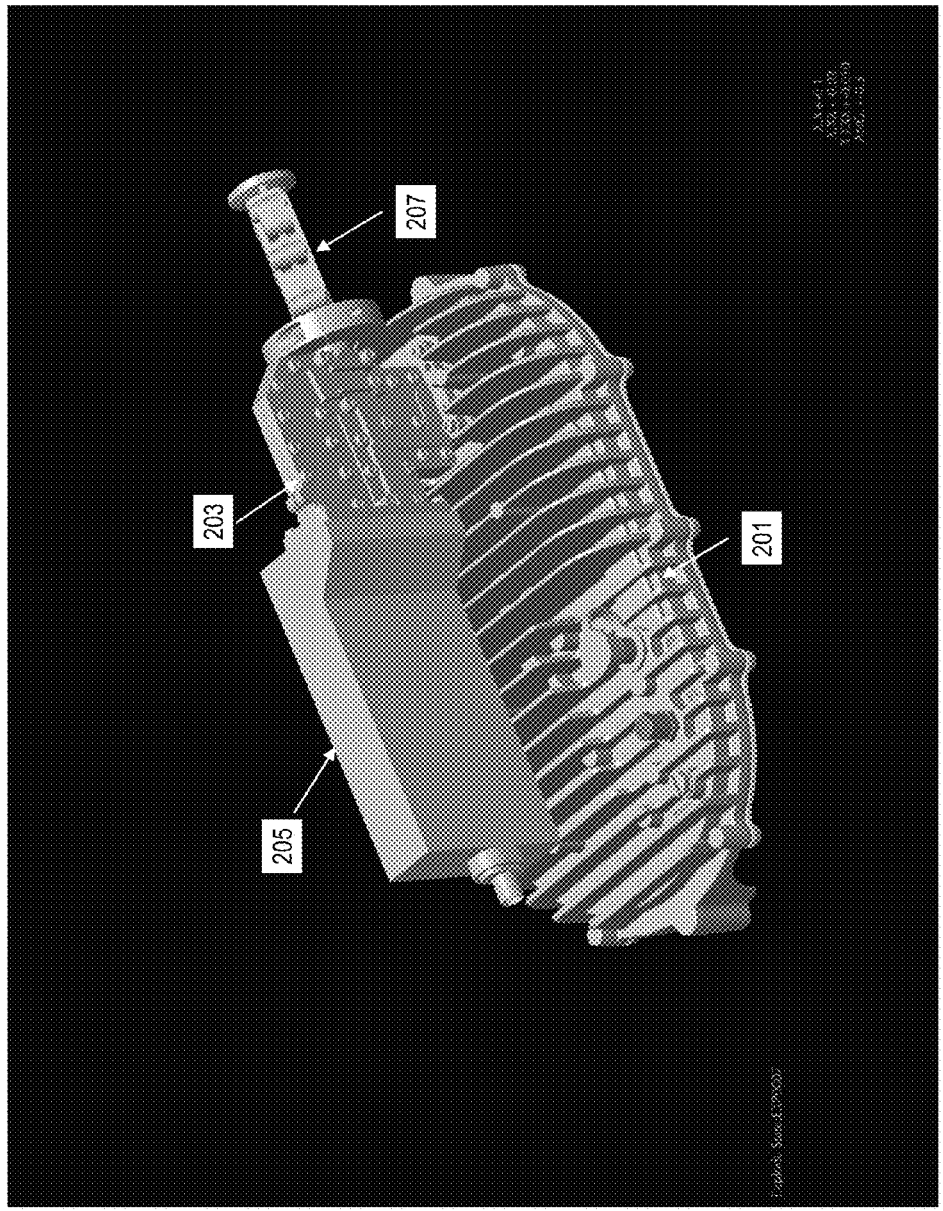
FIG. 2 is a diagram of a prior art radio for use in a microwave communication system.
Figure 3:
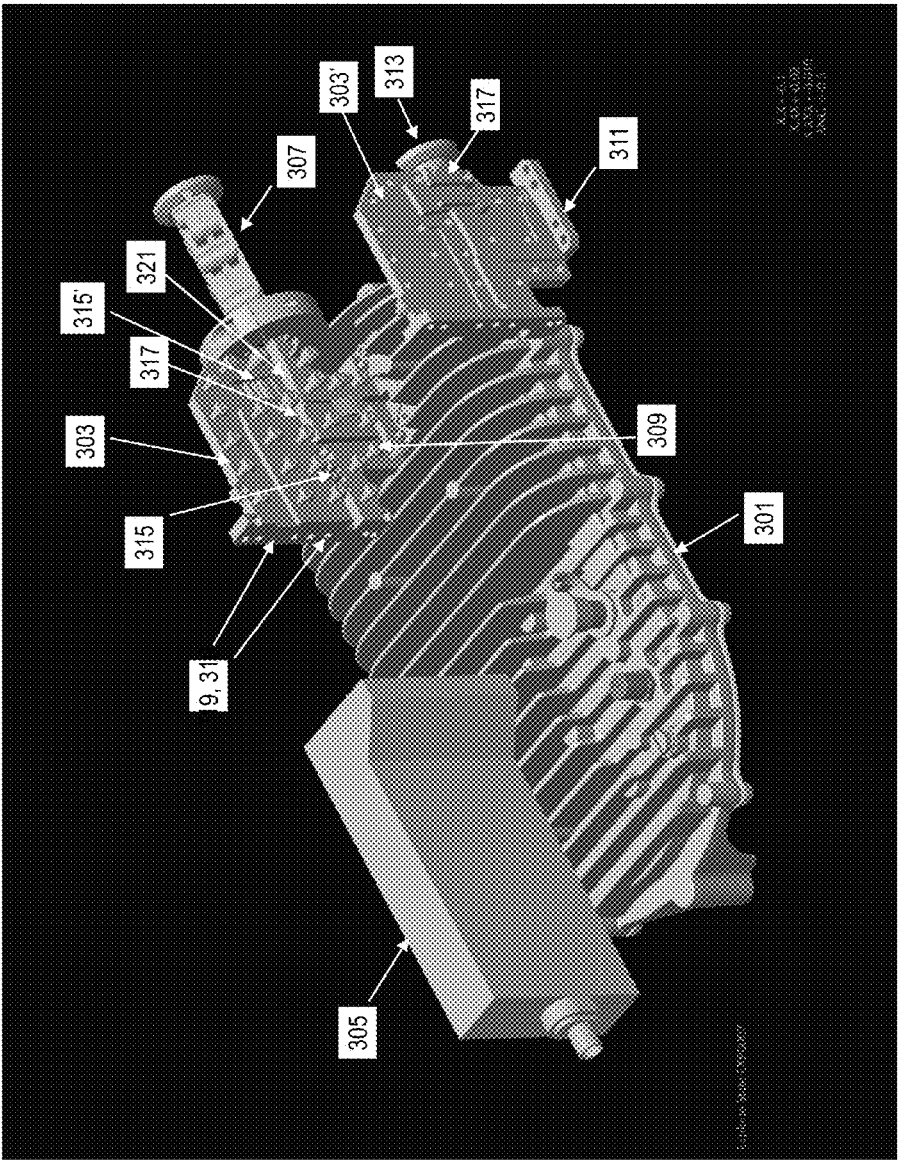
FIG. 3 is an exploded view of the prior art radio of FIG. 2.

FIGS. 2 and 3 are diagrams of an existing radio for use in an ODU of a remote ground terminal (e.g., a VSAT) operating in a Ka frequency band. FIG. 2 is a diagram of a prior art radio for use in a microwave communication system. By way of example, the radio 200 is about 10" long. The radio 200 includes a transmitter housing 201 that contains a transmitter module, a transmit-receive isolation assembly (TRIA) 203, a low noise block converter (LNB) 205 including a polarizer 207 that converts linearly polarized signals into circularly polarized signals or vice versa. In particular, the TRIA 203 is formed external to the transmitter housing 201. The LNB 205 is also formed external to the transmitter housing 201. The polarizer 207 is also external to the transmitter housing 201.

The transmitter circuit sealed in the housing 201 sends Tx signals from the terminal to the satellite. The transmitter circuit comprises a multiplexer for receiving a modulated data signal from the indoor unit, a phase lock loop (PLL) for frequency stabilizing and multiplying the modulated data signal, and a transmitter for amplifying and frequency multiplying the modulated data signal to generate a modulated carrier signal. The LNB 205 receives Rx signals from the satellite to the terminal. The LNB 205 transforms the received signal into a corresponding intermediate frequency signal. The intermediate frequency signal is then coupled to the IDU via the multiplexer.

The TRIA 203 is a microwave bridge arranged between the LNB 205 and the transmitter circuit, for separating flows of Rx signals from Tx signals. The TRIA 203 is an integrally formed unit that comprises essentially an ortho-mode transducer (OMT) and a diplexer. The OMT separates Rx signals and Tx signals when they have orthogonal polarizations (e.g., one being horizontal while the other being vertical). The diplexer including a split and filter banks, thereby separating Rx signals and Tx signals based upon signals frequencies. Rx signals and Tx signals always have different frequencies.

The TRIA 203 is a microwave bridge arranged between the LNB 205 and the transmitter circuit, for separating flows of Rx signals from Tx signals. The TRIA 203 is an integrally formed unit that comprises essentially an ortho-mode transducer (OMT) and a diplexer.

The OMT separates Rx signals and Tx signals when they have orthogonal polarizations (e.g., one being horizontal while the other being vertical). The diplexer including a split and filter banks, thereby separating Rx signals and Tx signals based upon signals frequencies. Rx signals and Tx signals always have different frequencies.

The diplexer includes high pass filters, band-pass filters, and/or low-pass filters. The band pass filter attenuates signals outside of a predefined receiver bandwidth, in order to prevent possible interference. This radio has a frequency of operation in the Ka band (17-40 GHz), especially in the range of 18.3-30 GHz. The radio may also have a voltage standing wave ratio (VSWR), which can also be referred to as return loss, of equal to or less than 1.3:1. The radio may have other electrical performance requirements such as insertion loss and a rejection band.

Different services operate on different polarizations. Even on one satellite, there are often services operating simultaneously on the different polarizations. Satellites and antennas with horizontal and vertical polarization schemes are known as linear polarization systems. Direct Broadcast Satellite (DBS) service operates in a circular polarization scheme. The radio 200 is used in conjunction with a circular polarization feed assembly.

The polarizer 207 is also external to the transmitter housing 201. The Ka band operation requires horizontal signal and vertical signals to be converted to circularly polarized waves to respectively spin clockwise and counter-clockwise. The horizontally polarized signal is converted to spin in one direction, while the vertically polarized signal is converted to spin the opposite direction. The polarizer 207 converts a circularly polarized wave into a linearly polarized wave, or vice versa. By way of example, when a right-hand circular polarization (RHCP) receive signal comes in the polarizer 207, it is phase-shifted into a linear polarized signal. The polarizer 207 is physically rotatable to effect either a left-hand circular polarization (LHCP) or a right-hand circular polarization (RHCP). The Ka band operation requires the polarizer 207 to convert a linearly polarized wave into a circularly polarized wave with regard to the transmit signals, or convert a circularly polarized wave into a linearly polarized wave with regard to the receive signals.

Due to the complexity of their designs, the housing 201, the TRIA 203, and the polarizer 207 need to be produced by die-casting high precision metal such as magnesium, zinc, gold, titanium, etc.

FIG. 3 is an exploded view of the prior art radio of FIG. 2. Within the metal housing 301, there is a transmitter module/electronics (not shown). The metal housing 301 is typically manufactured by metal die-casting, for both protection against the elements and for heat dissipation. In FIG. 3, the LNB 305 is separated from the TRIA 303 to expose transmit ports. In addition, the TRIA 303 is dissembled into two blocks to expose a diplexer (including a split and filter banks). The two blocks include a first block 303 and a second block 303'. The blocks are embodied with an OMT 323 and the diplexer. A polarizer 307 of the TRIA 303 is still connected to the first block 303.

A transmit (Tx) port 311 receive a Tx signal from a power amplifier of the terminal. A high-pass Tx filter 309 is located on the lower part of the first block 303 to let through the transmit signals, while stopping any Rx signals from getting therethrough. In particular, the transmit signal exits out of the radio via a common port 313 to the satellite.

One band-pass Rx filter 315 (with multiple stages) is built in the lower part of the first block 303. Another band-pass Rx filter 315' (with multiple steps) is built in the upper part of the first block 303, to let through the receive signals while stopping the transmit signal from getting therethrough. In particular, a receive (Rx) signal from the satellite (typically including an antenna) enters via the common port 313 and then separated by the ortho-mode transducer (OMT) 317 into a horizontally polarized signal and a vertically polarized receive signal (e.g., to double the spectral efficiency and to double the receive capacity by utilizing the same frequency band twice). The horizontally polarized signal and the vertically polarized signal then respectively travel via the two band-pass Rx filters 315, 315', and exit respectively via a pair of receive (Rx) ports 319, 319'. The (Rx) ports 319 connect with the LNB 305. The diplexer 321 separates the Rx and Tx signals of the same polarization based upon frequencies.

The common port 313 connects the TRIA 303 to the satellite, and transmits signals from the transmitter to the satellite therethrough, meanwhile transmitting the receive signals from the satellite into the transmitter. This radio 300 is costly to manufacture, heavy and bulky. First of all, the radio 300 includes many components each of which needs to be die-cast. The components are expensive and time consuming to make, to assemble and to ship. Secondly, the TRIA 303 (including the polarizer 307), the LNB 305 are exposed to the elements and vulnerable to water leaks. Thirdly, the radio 300 are physically large and heavy such that it requires strong and expensive antennas to support.

As such, there exists a need for a single integrated radio which does not require a plurality of individual components or additional transitions and transformers to be utilized to interface with either the terminal or the satellite.

Figure 4:
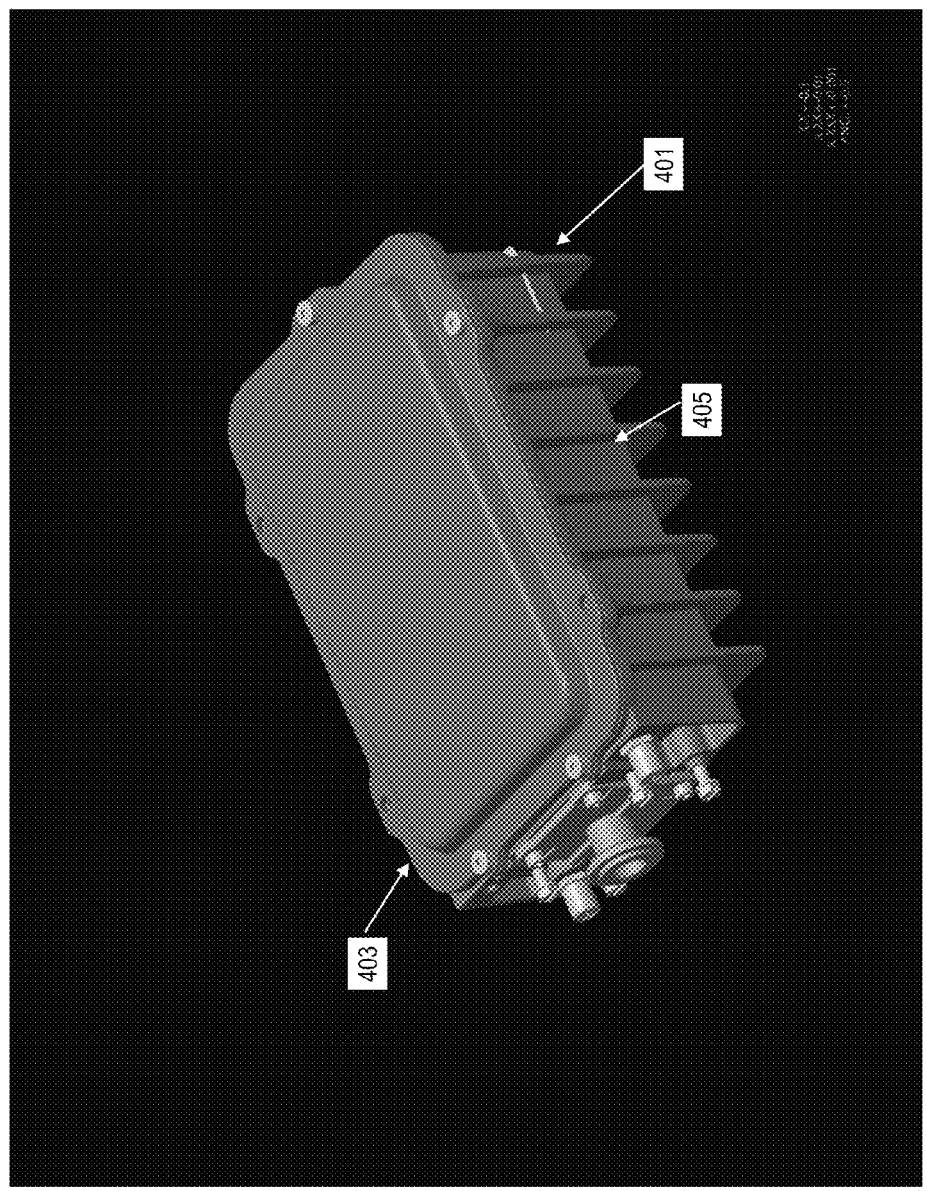
FIG. 4 is a diagram of a radio for use in a microwave communication system, in accordance with an exemplary embodiment.
Figure 5:
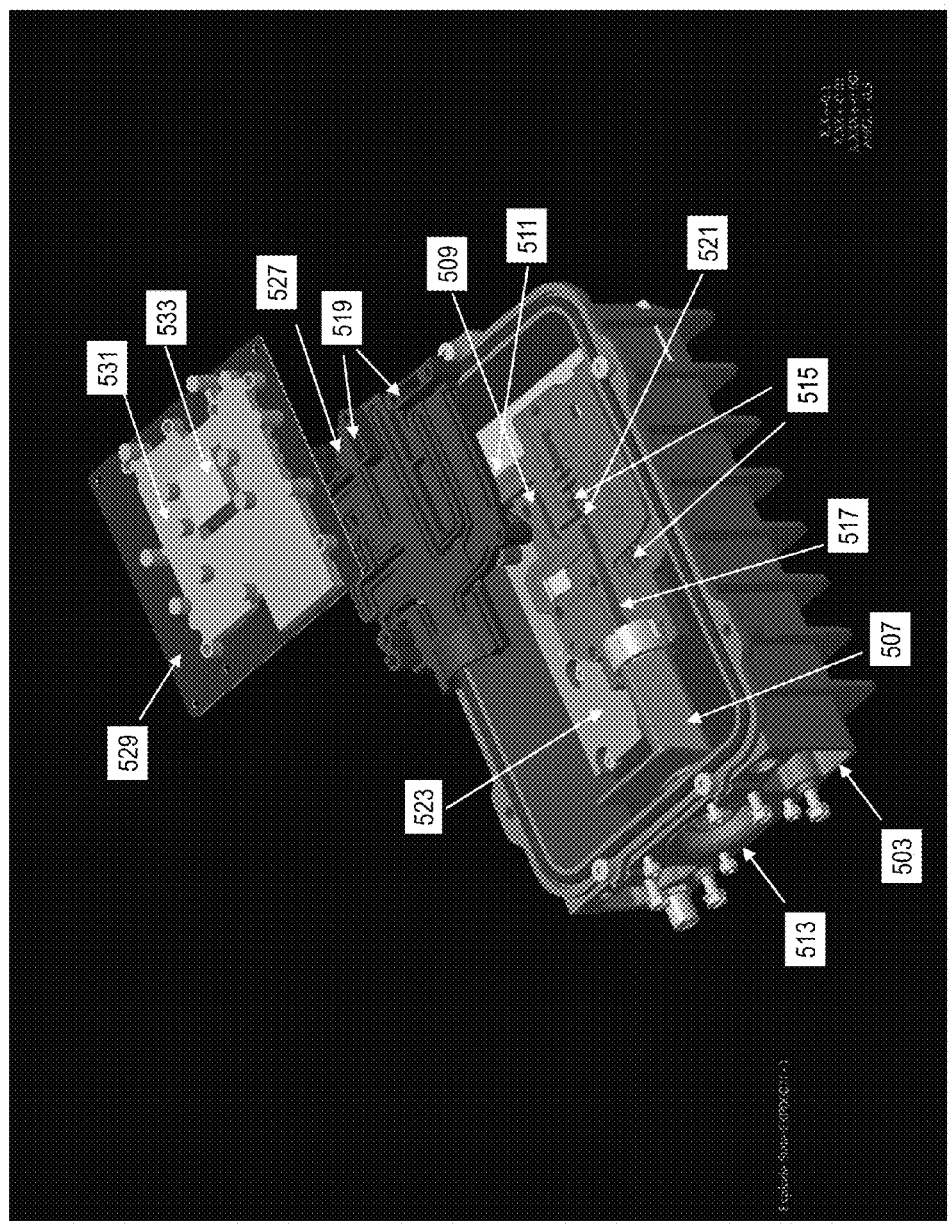
FIG. 5 is an exploded view of the radio of FIG. 4.
Figure 6:
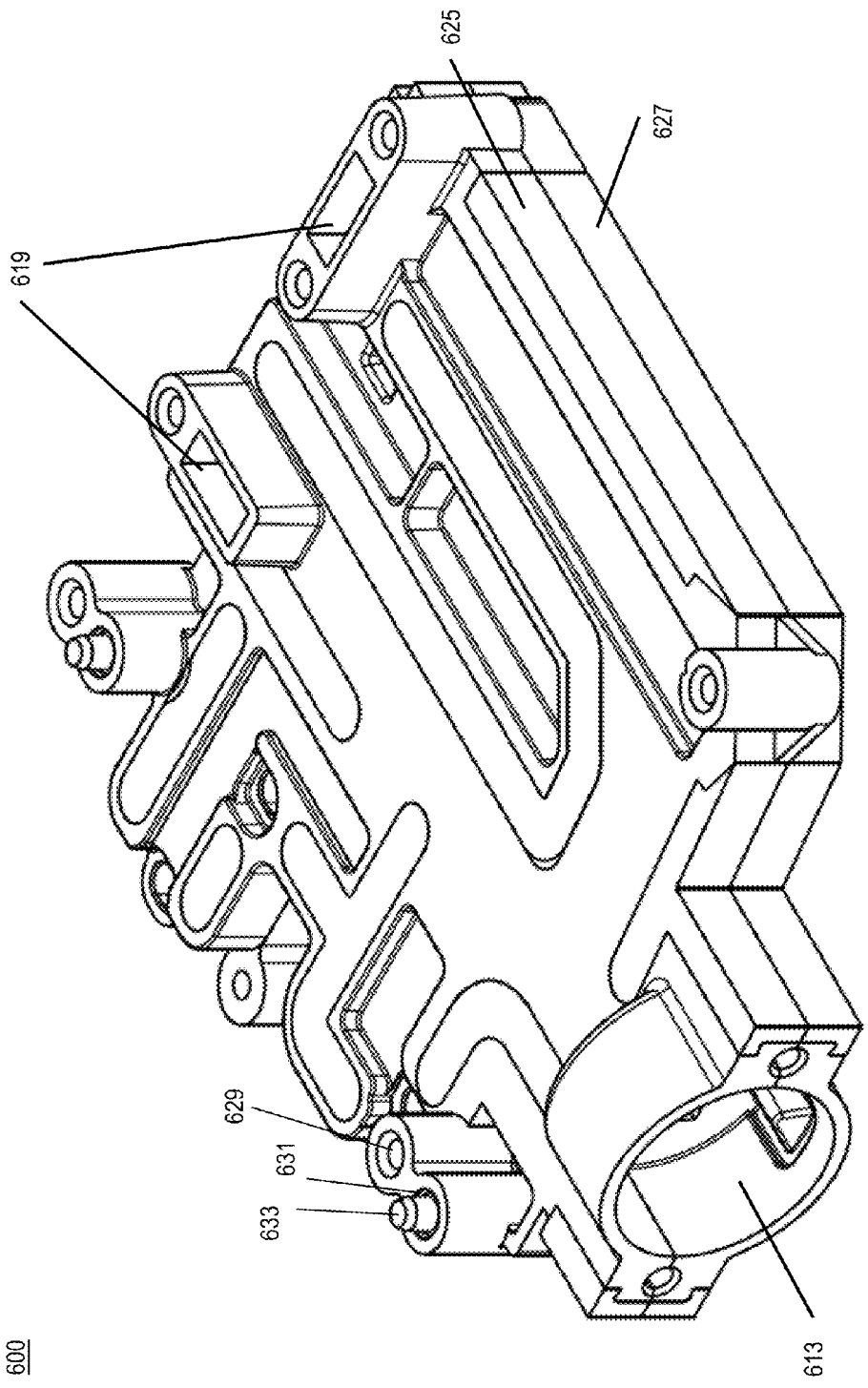
FIG. 6 is a perspective view of a first plate and a second plate of the radio of FIG. 4.
Figure 7:
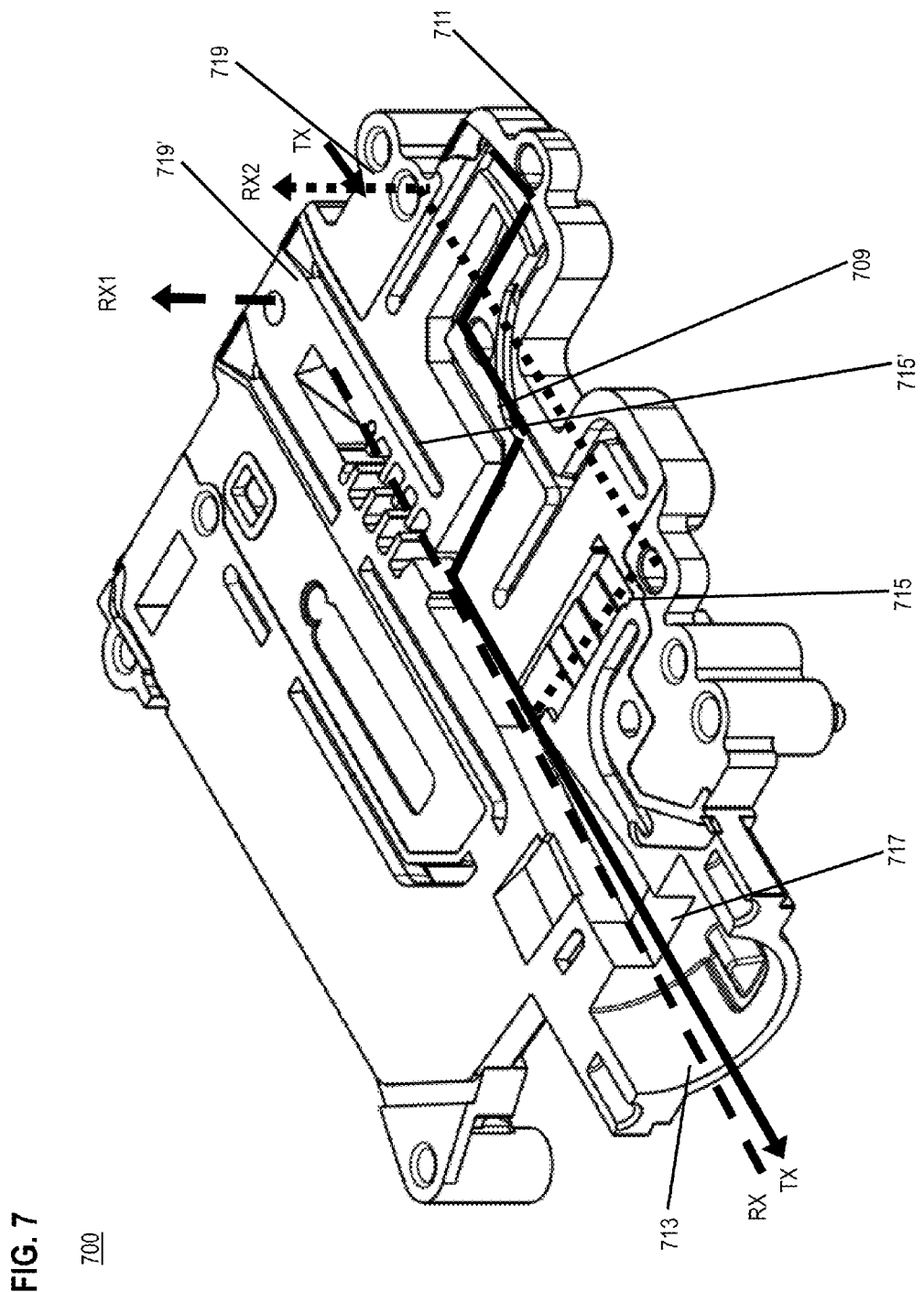
FIG. 7 is a perspective view of the second plate of the radio of FIG. 4.

FIGS. 4-7 are diagrams of an integrated radio, according to various exemplary embodiments. FIG. 4 is a diagram of a radio for use in a microwave communication system, in accordance with an exemplary embodiment. In this embodiment, the radio 400 includes a transmitter housing 401 with a upper cover 403 and a lower housing 405. In one embodiment, the transmitter housing 401 has dimensions of approximately 8 inch×5 inch×2.5 inch and operates in the Ka band, e.g., 18.3-30 GHz. The Ka band operation requires a high precision for the radio components such that the components are individually metal die-casted (e.g., made of zinc), and then sealed in the transmitter housing 401 (e.g., made of aluminum). FIGS. 5-7 show details of the radio of FIG. 4.

FIG. 5 is an exploded view of the radio of FIG. 4. In FIG. 5, a lower housing 503 of a radio 500 contains a base plate 523, a bottom structure plate 509, a top structure plate 527, and a circuit board 529. The circuit board 529 includes transmitter electronics 531 and LNB electronics 533 thereon. In some embodiments, at least one of the transmitter electronics 531 and LNB electronics 533 are made of analogous circuits. In other embodiments, at least one of the transmitter electronics 531 and LNB electronics 533 are burned in one or more semiconductor chips to reduce the size of these components and their manufacturing cost.

The base plate 523 is placed on top of the lower housing 503. The bottom structure plate 509 is placed in-between the base plate 523 and the top structure plate 527. In one embodiment, the bottom structure plate 509 and the top structure plate 527 are engaged/assembled via metal injection without using any screws. When the metal cools down, it contrasts and seals the contacts in-between. The circuit board 529 is arranged on top of the top structure plate 527 and under the upper cover of the housing.

In particular, an integrated transmit-receive isolation filtering and polarization waveguide (INTRIFPWA) structure is embodied in the bottom structure plate 509 and the top structure plate 527. The INTRIFPWA functions substantially similar to the prior art TRIA. The inner surface of the bottom structure plate 509 is integrally formed with a half of the INTRIFPWA structure (including an OMT 517 and a diplexer). The inner surface of the top structure plate 527 is integrally formed with the other half of the INTRIFPWA structure (including the OMT 517 and the diplexer). FIG. 5 also shows a common port 513 and a polarizer 507 that converts linearly polarized signals into circularly polarized signals or vice versa.

In order to transmit and receive signals in circular polarities, the polarizer 507 is added between a feed horn and OMT 517, to converts CP into linear polarization (LP, both horizontal and vertical before they are separated by the OMT). The polarizer 507 is physically rotatable to effect either a left-hand circular polarization or a right-hand circular polarization. By way of example, the polarizer 507 is aligned to a desired reception polarity, either left hand circular polarization (LHCP) converted to horizontal linear polarization, or right hand circular polarization (RHCP) converted to horizontal linear polarization. The OMT 517 connected on the mouth of the polarizer 507 can also be adjusted to control polarization. In this embodiment, the circular polarization frequency of operation is in the range of 18.3-30 GHz.

The transmitter housing 501 and the INTRIFPWA do no require high precision metal, and may be produced from metal plated plastic, aluminum, plated magnesium, zinc, gold, titanium, aluminum, alloy (e.g., A356 aluminum alloy). By way of example, at least one of the structure plates is made of zinc, and the housing is made of aluminum.

FIG. 6 is a perspective view of an assembly 600 of a bottom structure plate 625 and a top structure plate 627 when they are engaged with each other as the INTRIFPWA 600 within the radio of FIG. 4. FIG. 6 also shows a common port 613 and two receive (Rx) ports 619. FIG. 6 also shows slots 629, 631, and an insert 633 in the slot 631. The insert 633 is inserted into the slot 631 when the first plate and the second plate are engaged. As later discussed in conjunction with FIG. 9, metal is injected into the slots 629, 631 to secure the contacts in-between the first plate and the second plate without using any screws.

FIG. 7 shows details of a bottom structure plate 700, after removing a top structure plate therefrom to expose the inside of the plate 700. In particular, FIG. 7 shows that the inside of the bottom structure plate 700 is integrally built-in with a half of the INTRIFPWA. The bottom structure plate 700 includes two receive ports 719, 719' and one transmit port 711.

The transmit port 711 receives a Tx signal with a frequency range of 29.25-30.0 GHz from a power amplifier of an IDU. The Tx signal then travels along a solid line in FIG. 7 via the high-pass Tx filter 709 that lets through the transmit signals, while stopping any Rx signals from getting therethrough. The Tx signal then passes via the common port 713 out of the INTRIFPWA to the satellite Meanwhile, a Rx signals of LHCP and RHCP are received from a satellite dish with a frequency range of 18.3-20.2 GHz via the common port 713 and are converted and separated by the polarizer into a horizontally polarized Rx1 signal and a vertically polarized Rx2 signal which respectively travel via two band-pass Rx filters 715, 715' along two broken lines in FIG. 7. One band-pass Rx filter 715 and one band-pass filter 715' respectively pass via the Rx signals while stopping the Tx signal from getting therethrough. The filtered Rx signals exit from two receive ports 719, 719' out of the INTRIFPWA. An ortho-mode transducer (OMT) 717 is integrally formed near the common port 713. The OMT 717 separates the RF singles of linear orthogonal polarizations. The assembly of the plate 700 and the top structure plate is formed in such a manner that the receive part of the OMT 717 is perpendicular to an axis the common port 713.

A diplexer, which separates the Rx and Tx singles of the same polarization, includes a split and filter banks (the high-pass Tx filter 709, two band-pass Rx filters 715, 715', and optionally and/or low-pass filters (not shown)) that are integrally built in the plate 700. The common port 713 of the INTRIFPWA connects to the satellite dish (typically an antenna), and transmit signals from the transmitter to the satellite dish therethrough, meanwhile the receive signals from the satellite dish go through the common port 713 into the transmitter.

By integrating these components inside as parts of the metal housing of the transmitter, according to the above-discussed embodiments, this approach largely avoids the disadvantages of the existing radios, such as the one shown in FIGS. 2 and 3.

In addition, by sealing the components inside the transmitter housing, the tendency of break down or water leakage is completely eliminated. As such, the INTRIFPWA is much cheaper to maintain (e.g., operation, inventory, etc.) in the long run. Moreover, the INTRIFPWA needs not to be weather sealed as it is embodied inside the transmitter housing, which further reduces the manufacturing cost.

Further more, by being sealed within the transmitter housing, the INTRIFPWA takes much less space. For the above reason, the resulting radio with the INTRIFPWA is physically much smaller and weighs much lighter. By building the common port, the transmit port, and the receive ports in the plates, as well as twisting the receive ports 90 degrees out of the plate, all the Rx and Tx signals travel on the same plane within the INTRIFPWA, rather than on different planes as in the prior art design of FIGS. 2-3. Therefore, the size of the radio and the relevant shipping cost are further reduced. By simplifying the number of the components as well as the shapes of the radio components, the embodiments of FIGS. 4-7 significantly reduce the packaging processing and cost.

Some of the above-discussed embodiments deploy integrated circuit (IC) in place of the prior-art of discrete-element circuit, to further reduce sizes and costs.

The integrated radio of the present disclosure does not require all its radio components to be sealed within the transmitter housing as the embodiment of FIG. 4. In other embodiments, the transmitter housing seals therein only at least a part of the low noise block converter, at least a part of the INTRIFPWA, or a combination thereof.

In yet other embodiments, the radio includes a first plate sealed in the transmitter housing, wherein at least a part of the transmit-receive isolation assembly is integrally built in the first plate. In yet other embodiments, the radio includes a second plate engaged with the first plate and sealed in the transmitter housing, wherein at least another part of the transmit-receive isolation assembly is integrally built in the second plate. In yet other embodiments, the first plate and the second plate are engaged into an INTRIFPWA.

In yet other embodiments, the INTRIFPWA further includes an ortho-mode transducer and a diplexer, and at least a part of the ortho-mode transducer, at least a part of the diplexer, or a combination thereof is integrally built in at least one of the first plate and the second plate. In yet other embodiments, one or more common ports are integrally built in at least one of the first plate and the second plate, and receive signals and transmit signals passed via the one or more common ports are separated by the ortho-mode transducer into one or more horizontally polarized signals and one or more vertically polarized signals. In yet other embodiments, one or more transmit ports and one or more receive ports integrally built in at least one of the first plate and the second plate, and receive signals and transmit signals are separated by the diplexer based upon frequencies thereof, and then exit via the one or more transmit ports and the one or more receive ports. In yet other embodiments, the diplexer includes one or more high-pass transmit filters, one or more low-pass filters, one or more band-pass receive filters, and at least a part of the one or more high-pass transmit filters, at least a part of the one or more low-pass receive filters, at least a part of the one or more band-pass receive filters, or a combination thereof is integrally built in at least one of the first plate and the second plate.

In yet other embodiments, the polarizer is physically rotatable to effect either a left-hand circular polarization or a right-hand circular polarization. In yet other embodiments, one or more common ports are integrally built in at least one of the first plate and the second plate, the polarizer engages with at a part of the one or more common ports.

In yet other embodiments, the radio further includes a circuit board including transmitter electronics, low noise block converter electronics, or a combination thereof, and the circuit board is sealed in the housing.

In yet other embodiments, transmit signals received via the one or more transmit ports exit the transmit-receive isolation assembly via the one or more common ports, and receive signals received via the one or more common ports exit the transmit-receive isolation assembly via two of the receive ports respectively.

In yet other embodiments, the one or more transmit ports and the one or more receive ports are built in an identical plane defined by the plate and the housing, and axes of the one or more transmit ports are perpendicular to axes of the one or more receive ports. In yet other embodiments, the one or more common ports are built in the identical plane, while the axes of the one or more transmit ports are in parallel with axes of the one or more common ports, and the axes of the one or more receive ports are perpendicular to the axes of the one or more common ports.

In yet other embodiments, at least one of the first plate and the second plate is made of zinc, and the housing is made of aluminum.

The microwave communication system supports a full range of remote ground terminals that support a variety of user applications. Each remote ground terminal has an outdoor transmitter, an antenna and an indoor modem equipped with fully integrated multiplexing solutions with TDM, ATM, and IP interfaces that can simultaneously support all types of traffic. The microwave communication system works with a carrier's platform for offering fiber-quality solutions that encompass voice, video, data, multimedia, and Internet services. The microwave communication system can be deployed to work with backhaul 2G/3G cell sites, Wi-Fi hotspots, and to provide broadband access to multi-tenant offices and residential complexes. With bandwidth management, the microwave communication system is IP-ready with QoS, offers high transmission speed (e.g., 155 Mbps) and ATM IMA interfaces at subscriber terminals. The microwave communication system acts as a universal radio that operates in both point-to-multipoint and point-to-point configuration. The outdoor portion of the terminals of the present disclosure weighs less and provides better installation options.

Figure 8:
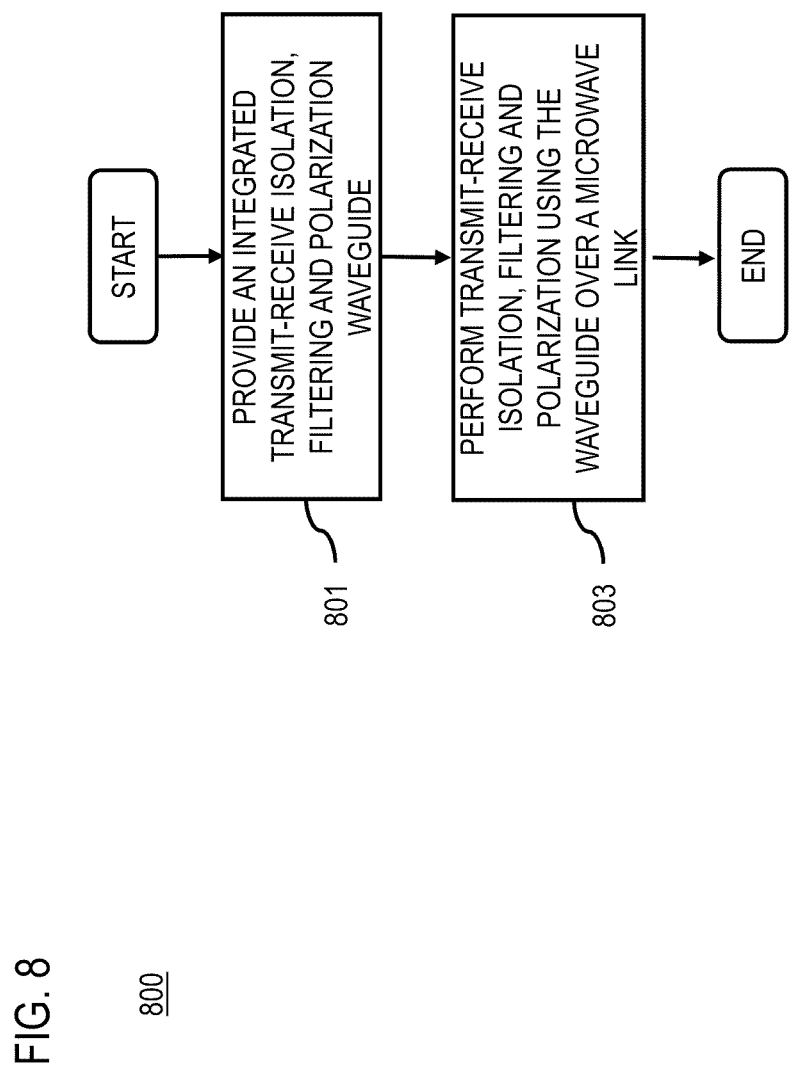
FIG. 8 is a flowchart of a process of using a radio of various exemplary embodiments.

FIG. 8 is a flowchart of a process 800 of using a radio of the above-discussed exemplary embodiments. This process 800, by way of example, can be performed by a VSAT of the present disclosure. In one embodiment, the radio 400 in provided in the VSAT (Step 801). In step 803, the VSAT uses the radio 400 to perform transmit-receive isolation, filtering and polarization over a microwave link. The VSAT receives and transmits signals in a Ka frequency band, e.g., 18.3-30 GHz.

Figure 9:
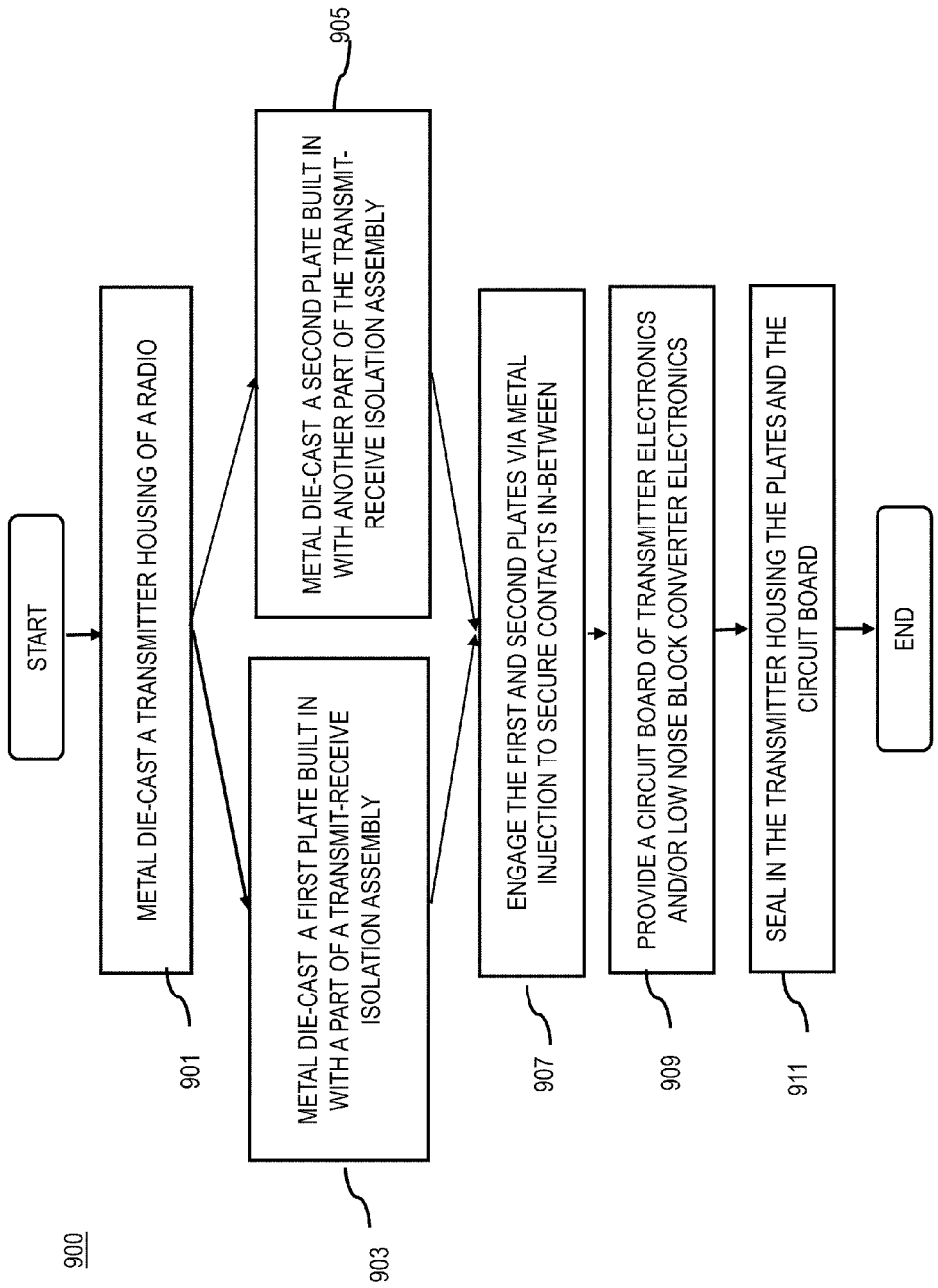
FIG. 9 is a flowchart of a process of producing a radio of various exemplary embodiments.

FIG. 9 is a flowchart of a process 900 of producing a radio of various exemplary embodiments. This process 900, by way of example, can be performed by an automated machinery. In one embodiment, the machinery metal die-casts a transmitter housing of the radio (Step 901). In step 903, the machinery die-casts a first plate built in with at least a part of the INTRIFPWA. The machinery also die-casts a second plate built in with at least another part of the INTRIFPWA (Step 905). The housing, the first plate, and the second plate can be metal die-casted in any order other than one depicted in FIG. 9.

The machinery engages the first plate with the second plate via injecting metal into slots in-between the first and second plates (Step 907). When the metal cools down, it contrasts and secures contacts between the first plate and the second plate without using any screws. The machinery further engages a polarizer with the engaged first and second plates to provide the INTRIFPWA. The machinery also provides a circuit board of transmitter electronics and/or low noise block converter electronics (Step 911). The polarizer converts linearly polarized signals into circularly polarized signals or vice versa. Thereafter, the machinery seals in the transmitter housing: the INTRIFPWA and the circuit board (Step 913).

Figure 10:
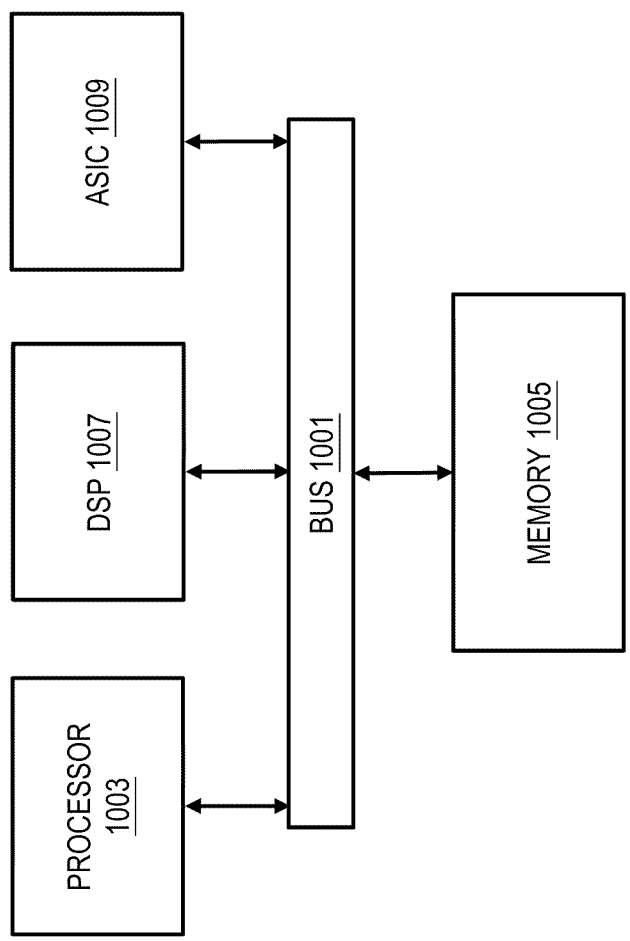
FIG. 10 is a diagram of a chip set that can be used to implement various exemplary embodiments.

FIG. 10 is a diagram of a chip set used in the machinery described in conjunction with FIG. 9 for producing a radio of various exemplary embodiments. Chip set 1000 includes, for instance, the processor and memory components incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps for controlling a direct current gain of a resonant converter to increase power efficiency within a circuit.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to perform specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein for controlling a direct current gain of a resonant converter to increase power efficiency within a circuit. The memory 1005 also stores the data associated with or generated by the execution of the inventive steps.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A transmitter and receiver apparatus, comprising:
a first assembly plate and a second assembly plate, wherein the first and second assembly plates comprise isolation and filtering components formed within them, wherein the first assembly plate and the second assembly plate fixedly attach to one another in a manner forming an integral transmit-receive isolation and filtering assembly;
a low noise block converter;
a polarizer that converts linearly polarized signals into circularly polarized signals or vice versa; and
a first housing component and a second housing component, wherein the transmit-receive isolation and filtering assembly, the low noise block converter and the polarizer mount within the first and second housing components, wherein the first and second housing components fixedly attach together to form a hermetically sealed housing assembly with the transmit-receive isolation and filtering assembly, the low noise block converter and the polarizer being housed therein.

2. An apparatus of claim 1, wherein the transmit-receive isolation and filtering components formed within the first and second assembly plates includes an ortho-mode transducer and a diplexer.

3. An apparatus of claim 2, wherein the transmit-receive isolation and filtering components formed within the first and second assembly plates include one or more common ports, such that the apparatus is configured in a manner wherein receive signals and transmit signals passed via the one or more common ports are separated by the ortho-mode transducer into one or more horizontally polarized signals and one or more vertically polarized signals.

4. An apparatus of claim 3, wherein the transmit-receive isolation and filtering components formed within the first and second assembly plates include one or more transmit ports and one or more receive ports, such that the apparatus is configured in a manner wherein the transmit signals and the receive signals are separated by the diplexer based upon frequencies thereof, and pass through the one or more transmit ports and the one or more receive ports, respectively.

5. An apparatus of claim 2, wherein the diplexer includes one or more high-pass transmit filters, one or more band-pass receive filters, and one or more low-pass filters.

6. An apparatus of claim 1, wherein the polarizer is configured to be physically rotatable to effect either a left-hand circular polarization or a right-hand circular polarization.

7. An apparatus of claim 1, wherein the low noise block converter is embodied on a circuit board comprising low noise block converter electronics and transmitter electronics.

8. An apparatus of claim 4, wherein the transmit-receive isolation and filtering assembly is configured to receive transmit signals via the one or more transmit ports and to output the received transmit signals via the one or more common ports, and to receive receive signals via the one or more common ports and to output the received transmit signals via the one or more receive ports.

9. An apparatus of claim 3, wherein at least one of the one or more transmit ports and at least one of the one or more receive ports are formed in planes that are orthogonal to one another.

10. An apparatus of claim 9, wherein at least one of the one or more common ports is formed in a plane that is orthogonal to the planes of the at least one of the one or more transmit ports and the at least one of the one or more receive ports.

11. A method for producing a transmitter and receiver microwave radio, comprising:
metal die-casting a first assembly plate and a second assembly plate, wherein the first and second assembly plates are configured with isolation and filtering components formed within them;
fixedly attaching the first assembly plate and the second assembly plate to one another in a manner forming an integral transmit-receive isolation and filtering assembly;
metal die-casting a first housing component and a second housing component;
fixedly mounting the transmit-receive isolation and filtering assembly, a low noise block converter and a polarizer within the first and second housing components, and fixedly attaching the first and second housing components together to form a hermetically sealed housing assembly with the transmit-receive isolation and filtering assembly, the low noise block converter and the polarizer housed therein.

12. A method for producing a transmitter and receiver microwave radio according to claim 11, wherein the transmit-receive isolation and filtering components formed within the first and second assembly plates include an ortho-mode transducer and a diplexer.

13. A method for producing a transmitter and receiver microwave radio according to claim 12, wherein the transmit-receive isolation and filtering components formed within the first and second assembly plates include one or more common ports configured in a manner whereby receive signals and transmit signals passed via the one or more common ports would be separated by the ortho-mode transducer into one or more horizontally polarized signals and one or more vertically polarized signals.

14. A method for producing a transmitter and receiver microwave radio according to claim 13, wherein the transmit-receive isolation and filtering components formed within the first and second assembly plates include one or more transmit ports and one or more receive ports configured in a manner whereby the transmit signals and the receive signals would be separated by the diplexer based upon frequencies thereof and would pass through the one or more transmit ports and the one or more receive ports, respectively.

15. A method for producing a transmitter and receiver microwave radio according to claim 12, wherein the diplexer includes one or more high-pass transmit filters, one or more band-pass receive filters, and one or more low-pass filters.

16. A method for producing a transmitter and receiver microwave radio according to claim 11, wherein the polarizer is configured to be physically rotatable to effect either a left-hand circular polarization or a right-hand circular polarization.

17. A method for producing a transmitter and receiver microwave radio according to claim 16, wherein the transmit-receive isolation and filtering components formed within the first and second assembly plates include one or more common ports, and the polarizer engages with at least one of the one or more common ports.

18. A method for producing a transmitter and receiver microwave radio according to claim 14, wherein the transmit-receive isolation and filtering assembly is configured to receive transmit signals via the one or more transmit ports and to output the received transmit signals via the one or more common ports, and to receive receive signals via the one or more common ports and to output the received transmit signals via the one or more receive ports.

19. A method for producing a transmitter and receiver microwave radio according to claim 13, wherein at least one of the one or more transmit ports and at least one of the one or more receive ports are formed in planes that are orthogonal to one another.

20. A method for producing a transmitter and receiver microwave radio according to claim 19, wherein at least one of the one or more common ports is formed in a plane that is orthogonal to the planes of the at least one of the one or more transmit ports and the at least one of the one or more receive ports.

* * * * *